(12) United States Patent
Hayashi et al.

(10) Patent No.: US 7,527,088 B2
(45) Date of Patent: May 5, 2009

(54) EXHAUST GAS HEAT EXCHANGER

(75) Inventors: Takayuki Hayashi, Aichi-gun (JP); Akihiro Maeda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/358,927

(22) Filed: Feb. 21, 2006

(65) Prior Publication Data

US 2006/0137867 A1 Jun. 29, 2006

Related U.S. Application Data

(62) Division of application No. 10/189,957, filed on Jul. 3, 2002, now Pat. No. 7,077,190.

(30) Foreign Application Priority Data

| Jul. 10, 2001 | (JP) | ............................. 2001-209335 |
| Jan. 7, 2002 | (JP) | .................................. 2002-494 |
| Jan. 16, 2002 | (JP) | ................................ 2002-7333 |

(51) Int. Cl.
*F28F 9/22* (2006.01)
*F28F 9/013* (2006.01)

(52) U.S. Cl. ...................... 165/159; 165/162

(58) Field of Classification Search ................. 165/158, 165/159, 162
See application file for complete search history.

(56) References Cited

U.S. PATENT DOCUMENTS

| 2,388,721 A | 11/1945 | Clancy |
| 2,526,157 A | 10/1950 | Ramen |
| 2,820,614 A | 1/1958 | Hardgrove |
| 3,297,081 A | 1/1967 | Nunemaker |
| 4,688,631 A | 8/1987 | Peze et al. |
| 6,016,865 A | 1/2000 | Blomgren |

(Continued)

FOREIGN PATENT DOCUMENTS

| DE | 44 31 135 | 3/1996 |

(Continued)

OTHER PUBLICATIONS

Office Action dated May 12, 2006 in corresponding Japanese Application No. 2002-000494 with English translation.

(Continued)

*Primary Examiner*—Leonard R Leo
(74) *Attorney, Agent, or Firm*—Harness, Dickey & Pierce, PLC

(57) ABSTRACT

An exhaust gas heat exchanger has a tank, laminated exhaust gas tubes where the exhaust gas flows, a cooling water inlet pipe and a cooling water outlet pipe. The cooling water flows into the tank and flows through water passages between adjacent exhaust gas tubes and between an inner wall of the tank and an outermost exhaust gas tube. Ribs are formed on the exhaust gas tubes so as to lead the cooling water after colliding with an inner wall toward an upstream side of the exhaust gas tubes to prevent the cooling water from being stuck. Otherwise, spaces between an inner wall of a casing and the exhaust gas tubes are regulated to keep the flow rate of the cooling water in the casing so that the cooling water is prevented from being boiled locally by slow flow rate of the cooling water.

19 Claims, 13 Drawing Sheets

U.S. PATENT DOCUMENTS

| | | |
|---|---|---|
| 6,250,380 B1 | 6/2001 | Strahle et al. |
| 6,269,870 B1 | 8/2001 | Banzhaf et al. |
| 6,293,337 B1 | 9/2001 | Strahle et al. |
| 6,321,835 B1 | 11/2001 | Damsohn et al. |

FOREIGN PATENT DOCUMENTS

| | | |
|---|---|---|
| EP | 1 148 231 | 10/2001 |
| JP | U-57-61366 | 4/1982 |
| JP | U-58-158968 | 10/1983 |
| JP | 05-079791 | 3/1993 |
| JP | 08-313189 | 11/1996 |
| JP | H09-170891 | 6/1997 |
| JP | 11-13549 | 1/1999 |
| JP | 11-287571 | 10/1999 |
| JP | 2001-027157 | 1/2001 |
| JP | 2001-241872 | 9/2001 |
| JP | 2001-248980 | 9/2001 |
| JP | 2001-304787 | 10/2001 |
| JP | 2002-107091 | 4/2002 |

OTHER PUBLICATIONS

Three Search Reports each dated May 30, 2006 for co-pending application Nos. 0208630000, 0214541000 and 0214540000.
Office Action dated Dec. 26, 2006 (mailing date Jan. 9, 2007) issued in the corresponding JP application No. 2002-000494.
Office Action dated May 1, 2007 in corresponding Japanese Application No. 2002-007333 with English translation.
Office Action dated Mar. 26, 2008 issued in corresponding JP Application No. 2002-007333.

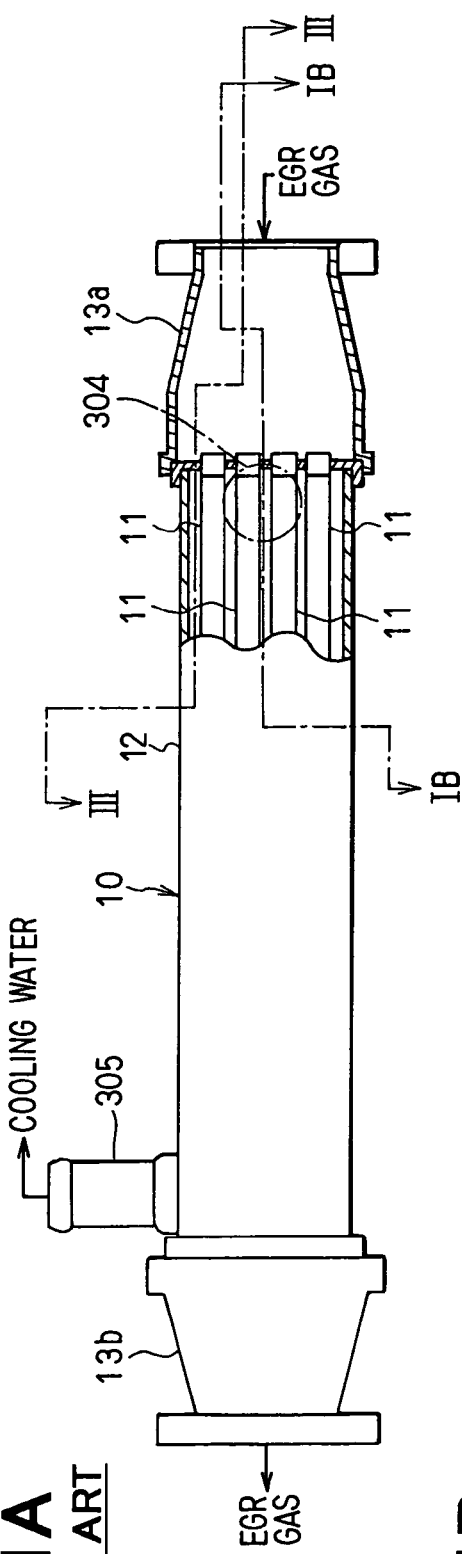
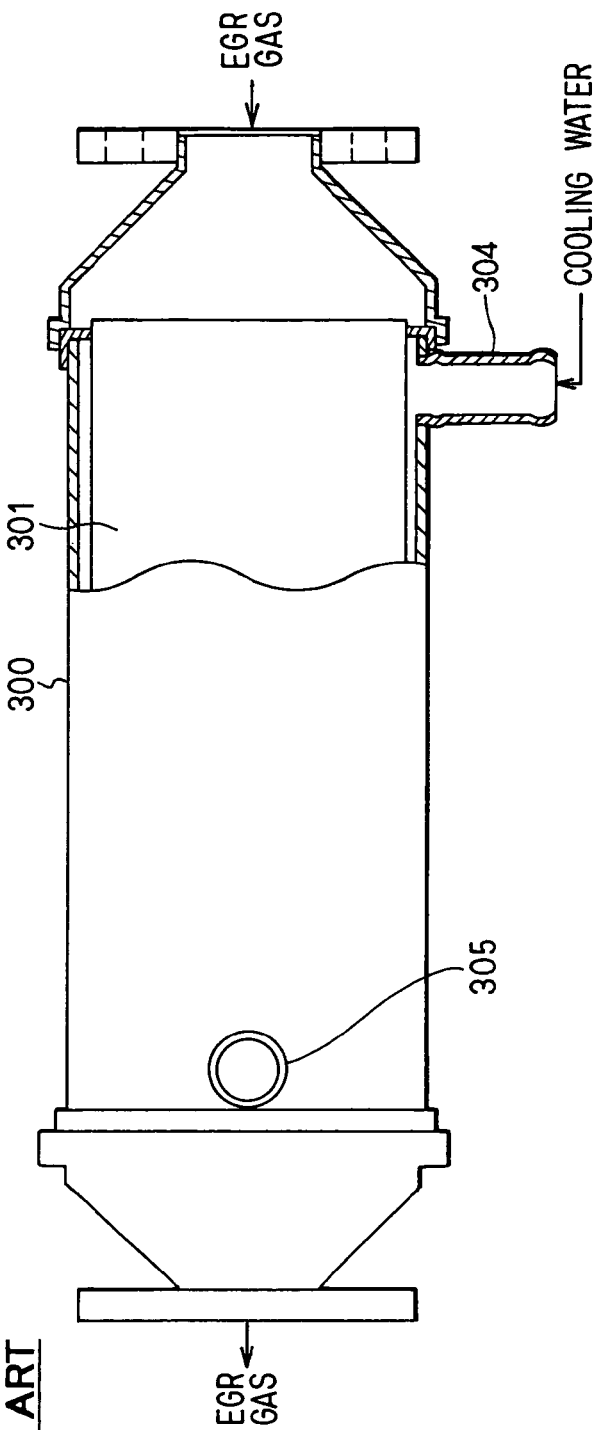
FIG. 1A RELATED ART
FIG. 1B RELATED ART

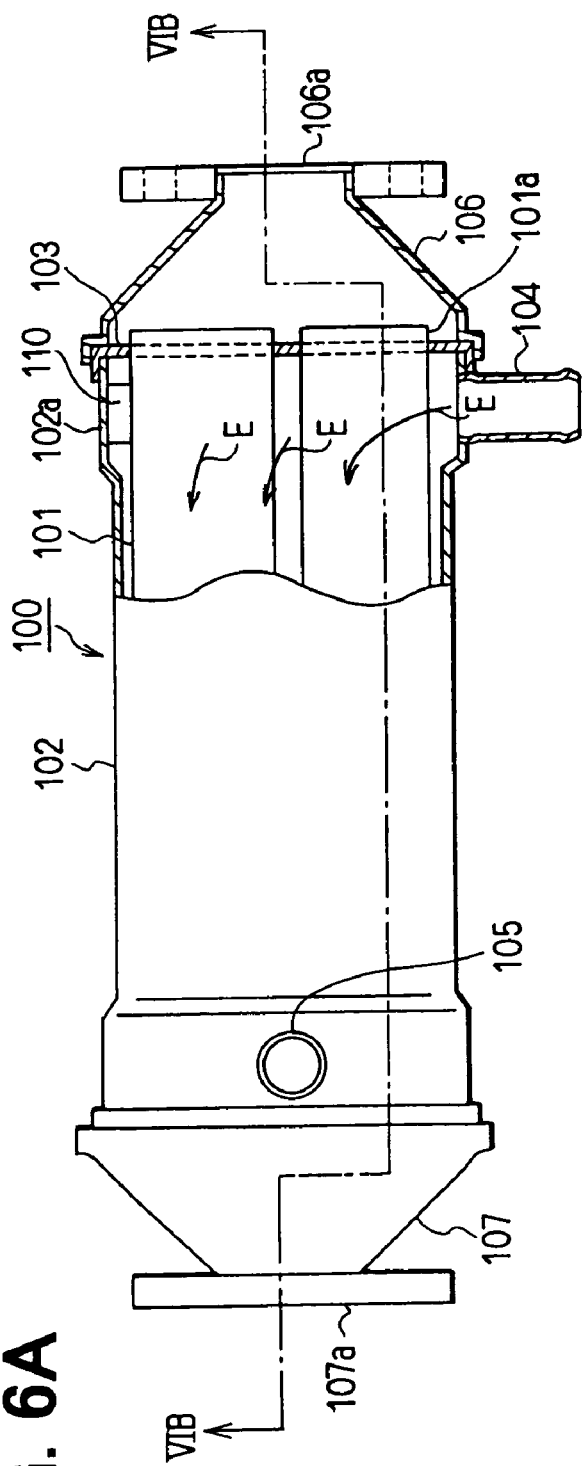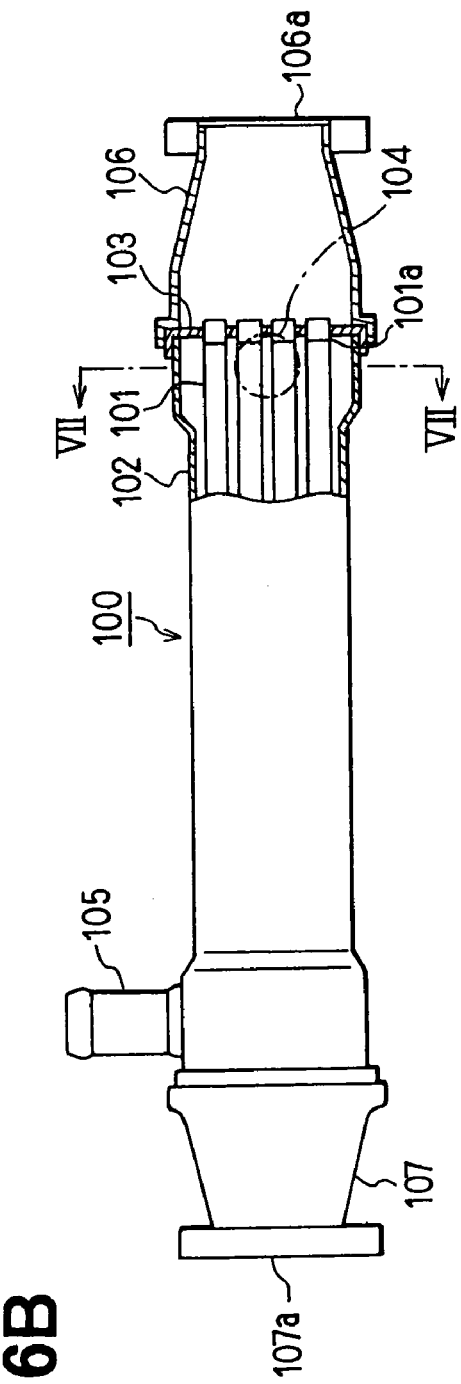
FIG. 6A
FIG. 6B

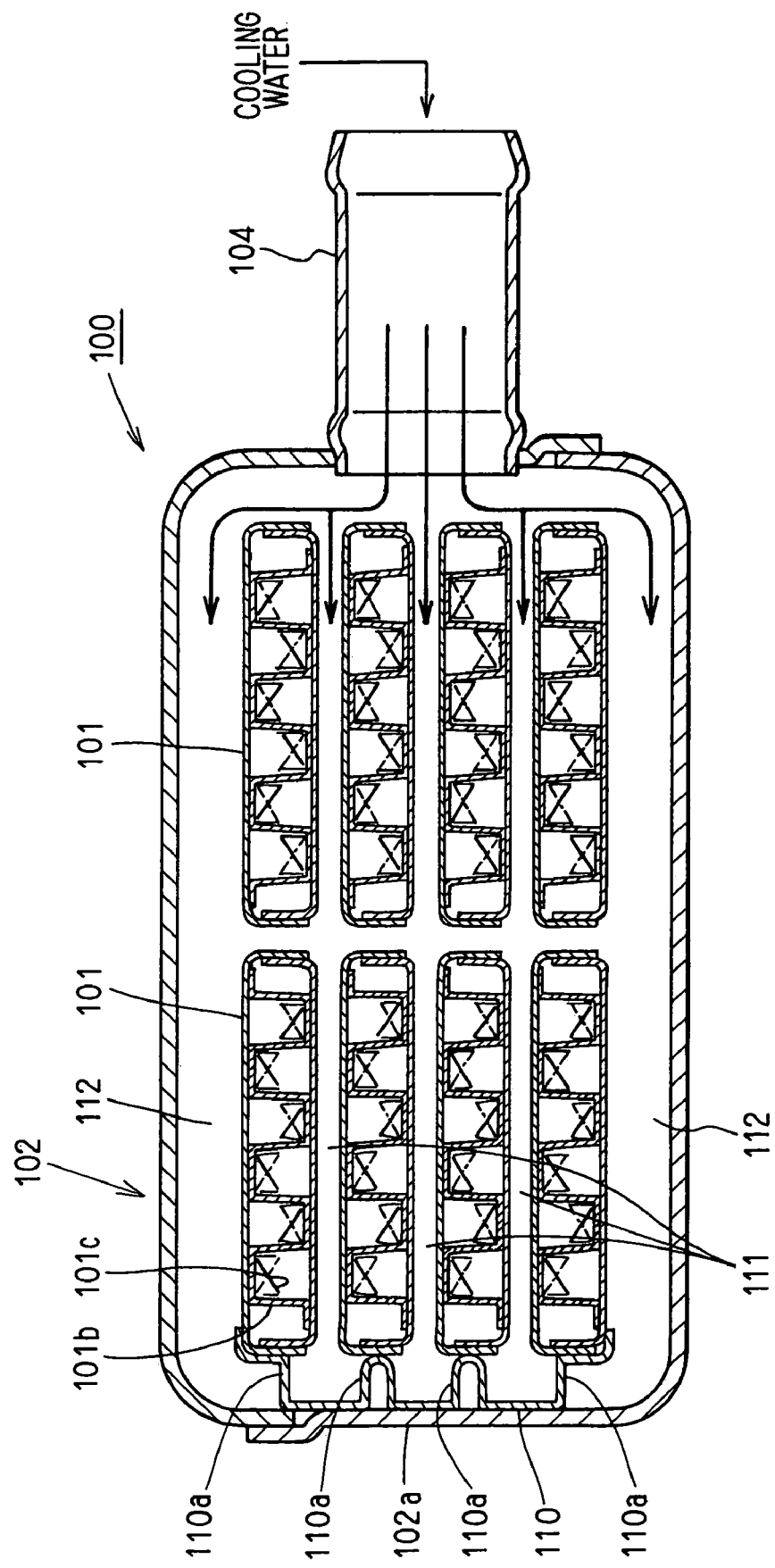

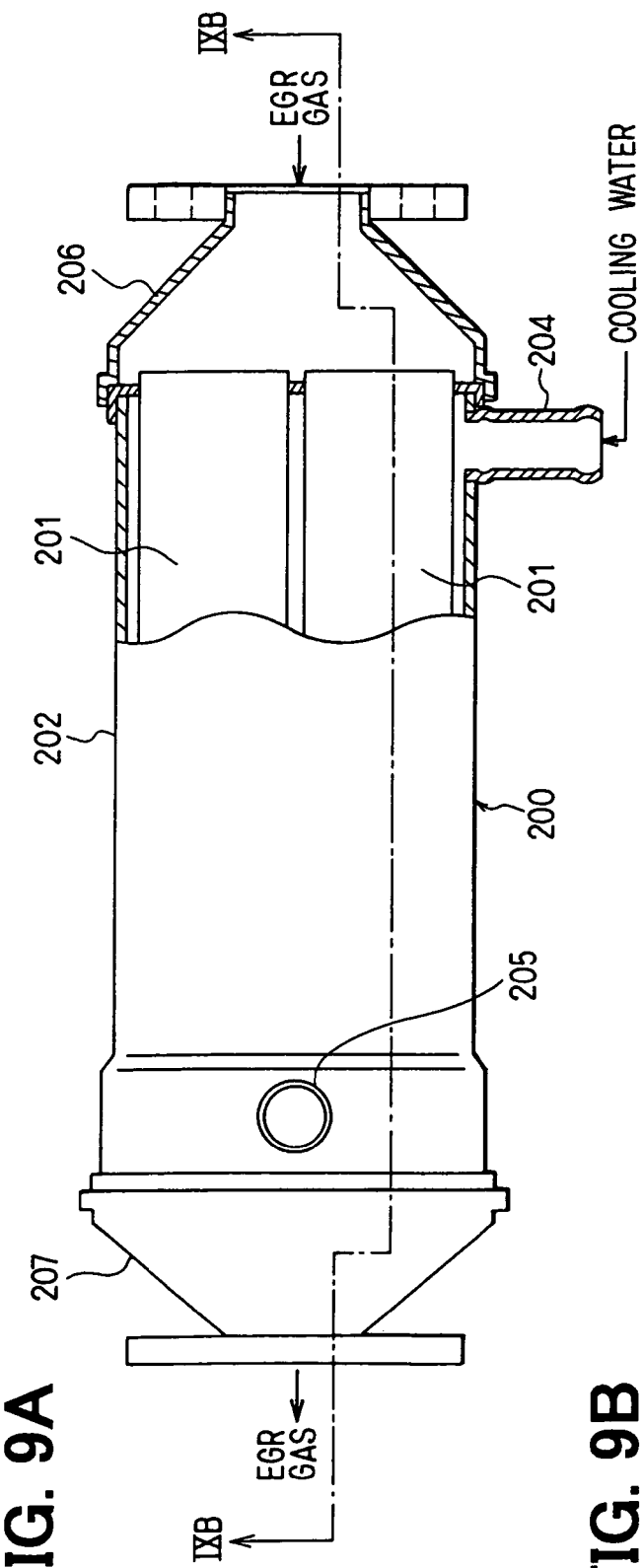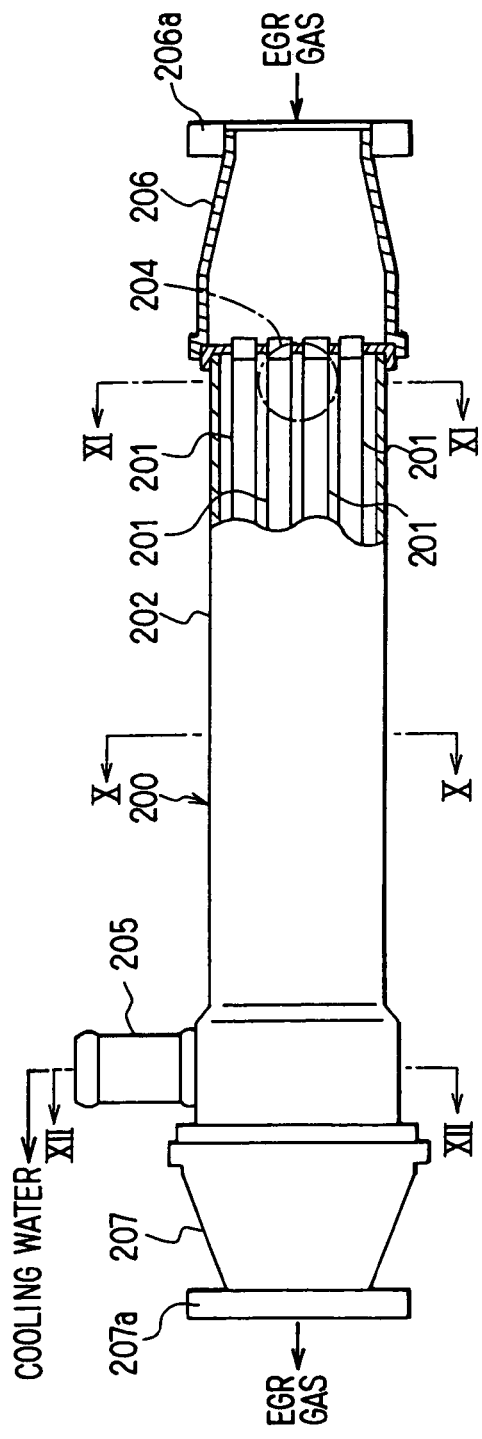
FIG. 9A
FIG. 9B

EXHAUST GAS HEAT EXCHANGER

CROSS REFERENCE TO RELATED APPLICATION

This application is a divisional application of U.S. Ser. No. 10/189,957 filed on Jul. 3, 2002 based upon Japanese Patent Applications No. 2001-209335, filed on Jul. 10, 2001, No. 2002-7333, filed on Jan. 16, 2002, and No. 2002-494, filed on Jan. 7, 2002, the contents of which are incorporated herein by reference.

BACKGROUND OF THE INVENTION

1. Field of the Invention

The present invention relates to an exhaust gas heat exchanger for performing heat exchange between exhaust gas generated by combustion and cooling water. Specifically, the present invention relates to an exhaust gas heat exchanger for cooling the exhaust gas in an exhaust gas recirculation system (i.e., EGR system).

2. Related Art

As shown in FIGS. 1A and 1B, as a prototype made by the inventors, an exhaust gas heat exchanger for cooling the exhaust gas in an EGR system (hereinafter, referred to as an EGR gas heat exchanger 300) can be equipped with plural laminated exhaust gas tubes 301 disposed in a tank 302 having a rectangular sectional pipe shape. The exhaust gas tubes 301 have a flat sectional shape, and are attached to a core plate 303 which closes the tank 302. A cooling water inlet pipe 304 and a cooling water outlet pipe 305 are connected to the tank 302 so that cooling water flows in the tank 302 to exchange heat with the exhaust gas passing through the exhaust gas tubes 301.

In this prototype, the inventors have found that the cooling water might be boiled at a location close to an upstream side of the exhaust gas tubes 301. The boiling of the cooling water may cause less efficiency about cooling of the exhaust gas flowing through the exhaust gas tubes 301, and/or rapid increase of inner pressure of the tank 302 that may degrade durability of the tank 302.

The inventors performed an experiment to visually observe the stream of the cooling water flowing in an EGR gas heat exchanger that has four exhaust gas tubes.

According to this experiment, when the cooling water inlet pipe is connected to the tank 302 so as to be disposed substantially perpendicular to a longitudinal direction of the exhaust gas tubes 301, the cooling water flows into each passage formed between each adjacent exhaust gas tubes 301 so as to turn approximately perpendicular as shown by arrows A (cooling water stream A) in FIG. 2, and it flows toward the cooling water outlet pipe 305. Moreover, some of the cooling water collides (impacts) with an inner wall 302a of the tank 302 that is opposite to the cooling water inlet pipe 304 as shown by arrows B (cooling water stream B) in FIG. 2, and then, it flows toward an exhaust gas pipe 301 located at an outermost side.

However, the cooling water stream A coming from the cooling water inlet pipe 304 and the cooling water stream B coming through the passages formed between each adjacent exhaust gas tubes 301 interfere with each other at the gaps formed between the inner walls 302a and the outermost exhaust gas pipes 301. As a result, the cooling water is easily stuck in the vicinity of the root portions of the exhaust gas pipes 301 where the exhaust gas pipes 301 are fixed to the core plate 303, as shown in FIGS. 1 and 3.

This means it may be possible to boil the cooling water when the cooling water is stuck in the vicinity of root portions of the exhaust gas pipes 301 of an upstream side of the exhaust gas. As a result, the efficiency for exchanging heat may be lowered.

Moreover, the local boiling of water may be caused by low flowing rate of the cooling water in the tank 302.

SUMMARY OF THE INVENTION

An object of the present invention is to provide an exhaust gas heat exchanger capable of eliminating the boiling of cooling water that may be caused by the sticking of the cooling water or caused by low flowing rate of the cooling water.

The exhaust gas heat exchanger has a tank, a plurality of exhaust gas passages provided in the tank through which exhaust gas flows and a water passage of the tank through which cooling water flows from a cooling water inlet tube to a cooling water outlet pipe.

According to an aspect of the present invention, a guide is provided in the tank to lead the cooling water that collides with an inner wall of the tank and flows so as to oppose the cooling water coming from the cooling water inlet pipe at an upstream side of the exhaust gas passages.

With this guide, the cooling water that collides the inner wall of the tank is led to a portion where the cooling water can contact upstream side portions of the exhaust gas passages. As a result, the cooling water is prevented from being stuck in the vicinity of the upstream side portions of the exhaust gas passages where the temperature of the exhaust gas is high, thereby preventing the cooling water from being boiled.

Preferably, the guide is provided in an exhaust gas heat exchanger in which the cooling water inlet pipe is provided on the tank so that the cooling water flows into the tank through the cooling water inlet pipe in a direction substantially perpendicular to a laminated direction of the exhaust gas passages and substantially perpendicular to a longitudinal direction of the exhaust gas passages, since the sticking of water easily occurs in this type of an exhaust gas heat exchanger.

Preferably, the guide is formed so as to protrude from an outer wall of at least one of the exhaust gas passages.

With this feature, the guide is used as a reinforcing portion for the passage for the cooling water.

According to another aspect of the present invention, a first bonnet for introducing the exhaust gas to the plurality of exhaust gas tubes is provided at one side of the tank, and a second bonnet for gathering the exhaust gas passing through the exhaust gas tubes. Moreover, a first plate is provided between the first bonnet and a cooling water passage for isolating the cooling water from the first bonnet, and a second plate is provided between the second bonnet and the cooling water passage for isolating the cooling water from the second bonnet. Furthermore, a guide is provided in the tank to lead the water that collides at an inner wall of the tank and flows so as to oppose the water coming from the cooling water inlet pipe to the vicinity of the root portions of the plurality of exhaust gas tubes that are attached to the first plate.

With this guide, the water that collides at an inner wall of the tank is led to the root portions of the plurality of exhaust gas tubes where the plurality of exhaust gas tubes are attached to the first plate. As a result, the cooling water is prevented from sticking in the vicinity of the root portions of the plurality of exhaust gas tubes where the exhaust gas having high temperature flows into the plurality of exhaust gas tubes, thereby preventing the cooling water from being boiled.

According to further aspect of the present invention, a partition wall is provided between an outermost water passage for the cooling water that is formed between an inner wall of the tank and an outermost exhaust gas passage and an inner water passage for the cooling water that is formed between adjacent exhaust gas passages.

With this partition wall, after the cooling water collides with the inner wall of the tank, the cooling water is prevented from flowing into the outermost passage formed between the inner wall and the outermost exhaust gas passage. Therefore, sticking of the cooling water at an upstream side of the plurality of exhaust gas passages, which is caused by the flow of the cooling water toward the outermost water passage formed between the inner wall and the outermost exhaust gas passage, is prevented, thereby preventing the cooling water from being boiled.

According to further another aspect of the present invention, an exhaust gas heat exchanger has a casing, a plurality of exhaust gas tubes provided in the casing through which exhaust gas flows and each of which has flat sectional shape, and a fluid passage of the casing through which fluid flows from a fluid inlet to a fluid outlet. In this exhaust gas heat exchanger, adjacent exhaust gas tubes are spaced apart from each other at a distance of $\delta$ t. Moreover, an outermost exhaust gas tube of the plurality of exhaust gas tubes is spaced apart from an inner wall of the casing that faces the outermost exhaust gas tube at a distance of $\delta$ in1 in a direction generally perpendicular to an inflow direction of the fluid coming into the casing through the fluid inlet and generally perpendicular to a longitudinal direction of the plurality of exhaust gas tubes. The distance of $\delta$ in1 is substantially equal to the distance of $\delta$ t to prevent flow rate of the fluid from being lowered lower than a predetermined rate.

According to further another aspect of the present invention, an exhaust gas heat exchanger has a casing, a plurality of exhaust gas tubes provided in the casing through which exhaust gas flows and each of which has flat sectional shape, and a fluid passage provided in the casing through which fluid flows from a fluid inlet to a fluid outlet. In this exhaust gas heat exchanger, the fluid inlet is provided on the casing so that the fluid can flow into the casing in a direction substantially perpendicular to a longitudinal direction of the plurality of exhaust gas tubes. Moreover, an outermost exhaust gas tube of the plurality of exhaust gas tubes is arranged in the casing so as to be spaced apart from an inner wall of the casing at a distance of $\delta$ in1 in a direction generally perpendicular to an inflow direction of the fluid from the fluid inlet and in a direction generally perpendicular to the longitudinal direction of the plurality of exhaust gas tubes. The distance $\delta$ in1 is equal to or greater than 1 mm but less than or equal to 5 mm.

With this distance $\delta$ in1, a flow rate of the fluid flowing through a space between the outermost exhaust gas tube and the inner wall of the casing can be prevented from being lowered lower than a predetermined flow rate.

According to further another aspect of the present invention, an exhaust gas heat exchanger has a casing, a plurality of exhaust gas tubes provided in the casing through which exhaust gas flows and each of which has flat sectional shape, and a fluid passage of the casing through which fluid flows from a fluid inlet to a fluid outlet. In this exhaust gas heat exchanger, the fluid outlet is provided on the casing so that the fluid flowing through the casing flows out from the casing in a direction generally perpendicular to a longitudinal direction of the plurality of exhaust gas tubes and in a direction generally parallel with an arranged direction of the plurality of exhaust gas tubes. An adjacent exhaust gas tubes are spaced apart from each other at a distance of $\delta$ t. Moreover, an outermost exhaust gas tube of the plurality of exhaust gas tubes is spaced apart from an inner wall of the casing that faces the outermost exhaust gas tube at a distance of $\delta$ out in the vicinity of the fluid outlet with respect to the fluid inlet in a direction generally perpendicular to the longitudinal direction of the plurality of exhaust gas tubes and generally parallel with the arranged direction of the plurality of exhaust gas tubes. The distance $\delta$ out is greater than the distance of $\delta$ t.

With this feature, pressure loss of the fluid in the casing is prevented from increasing, thereby preventing mass flow of the fluid from decreasing. Therefore, the effect of heat exchange between the fluid and the exhaust gas is prevented from decreasing, and local boiling of the fluid is prevented.

Preferably, the distance $\delta$ out is greater than or equal to 5 mm.

Incidentally, the plurality of exhaust gas tubes may be spaced apart from an inner wall of the casing at a distance of $\delta$ in2 in a direction generally parallel with the inflow direction of the fluid coming into the casing through the fluid inlet and generally perpendicular to a longitudinal direction of the plurality of exhaust gas tubes. The distance $\delta$ in2 is greater than or equal to the distance $\delta$ out. This distance $\delta$in2 improves the distribution efficiency of the fluid to each space between the adjacent exhaust gas tubes and allows the pressure loss in the vicinity of the fluid inlet to be reduced.

Preferably, the distance $\delta$ in2 is greater than or equal to 1 mm to secure the distribution efficiency of the fluid to each space between the adjacent exhaust gas tubes and the reduction of the pressure loss.

Other features and advantages of the present invention will become more apparent from the following detailed description made with reference to the accompanying drawings.

BRIEF DESCRIPTION OF THE DRAWINGS

FIG. 1A is a partial cross sectional view showing an EGR gas heat exchanger in the related art;

FIG. 1B is a partial cross sectional view of the EGR gas heat exchanger in the related art taken along line IB-IB in FIG. 1A;

FIG. 6A is a partial cross sectional view of an EGR gas heat exchanger in a second embodiment of the present invention;

FIG. 6B is a partial cross sectional view of the EGR gas heat exchanger in the first embodiment of the present invention taken along line VIB-VIB in FIG. 6A;

FIG. 7 is a cross sectional view of the EGR gas heat exchanger in the first embodiment of the present invention taken along line VII-VII in FIG. 6B;

FIG. 9A is a partial cross sectional view of an EGR cooler in the third embodiment of the present invention;

FIG. 9B is a partial cross sectional view of the EGR cooler in the third embodiment of the present invention taken along line IXB-IXB in FIG. 9A;

DETAILED DESCRIPTION OF THE PREFERRED EMBODIMENT

Figure 2:
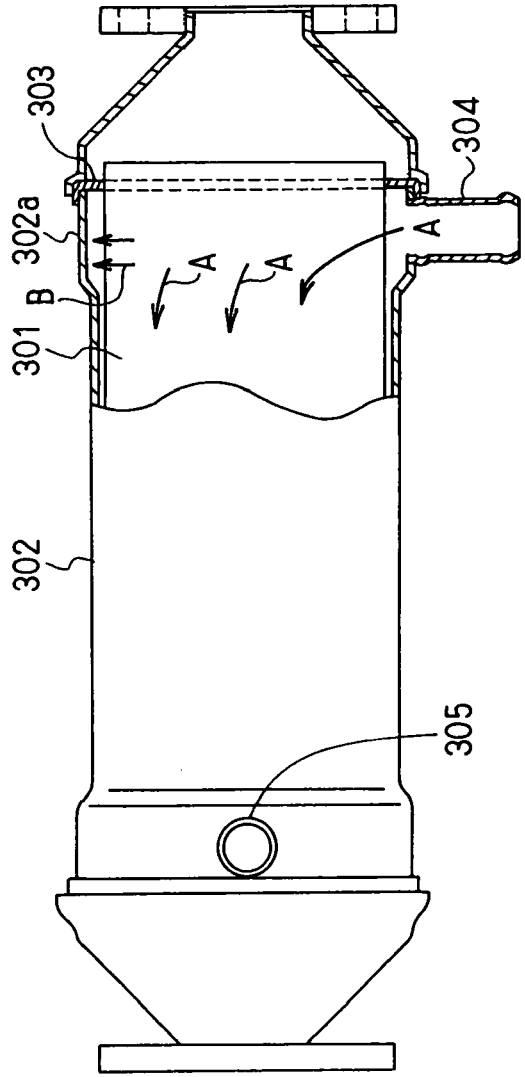
FIG. 2 is a partial cross sectional view similar to FIG. 1B of the EGR gas heat exchanger in the related art.
Figure 3:
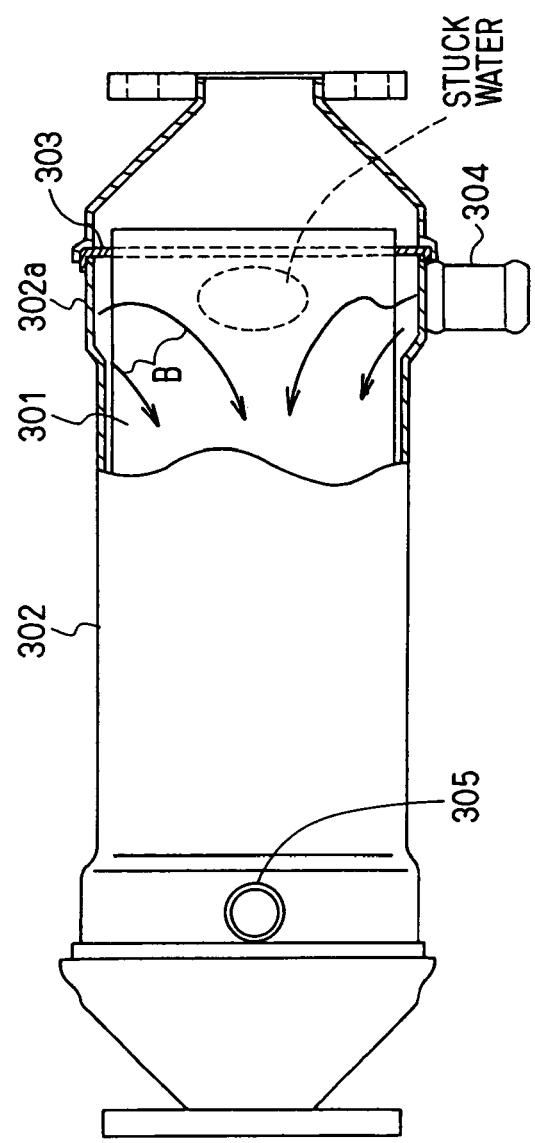
FIG. 3 is a partial cross sectional view of the EGR gas heat exchanger taken along line III-III in FIG. 1A.

Specific embodiments of the present invention will now be described hereinafter with reference to the accompanying drawings in which the same or similar component parts are designated by the same or similar reference numerals.

First Embodiment

Figure 4:
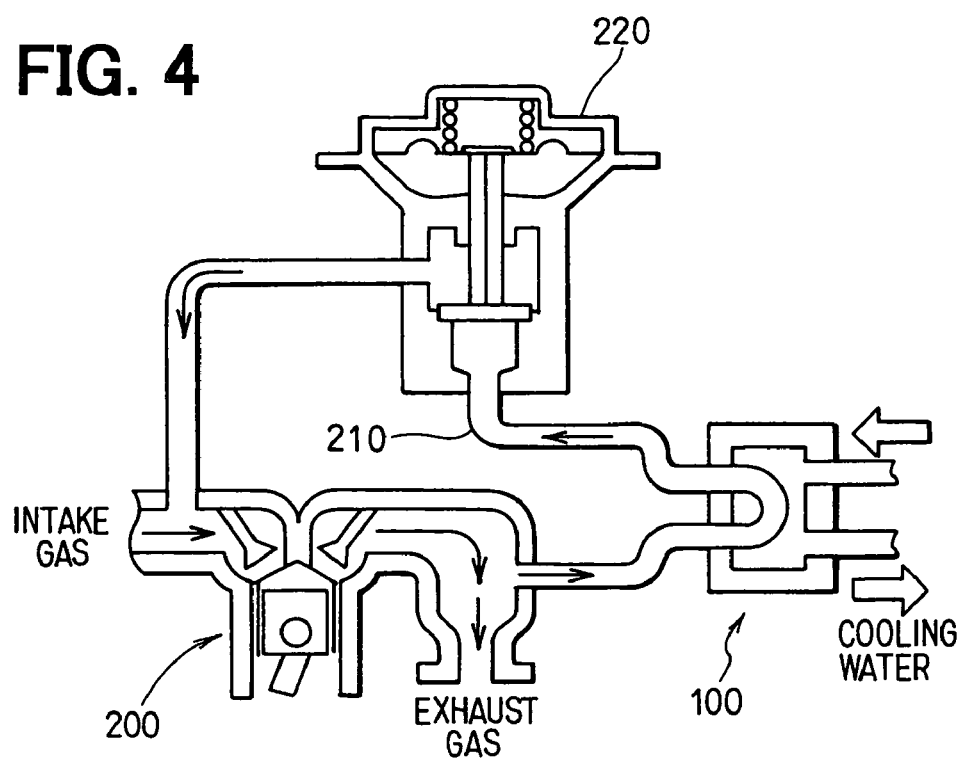
FIG. 4 is a schematic view of an EGR system according to the present invention.

A first preferred embodiment of the present invention will be now described with reference to FIGS. 4, 5A and 5B. In the first embodiment, the present invention is typically applied to an EGR cooler of an exhaust gas recirculation system (EGR system) for a diesel engine 200 (internal combustion system). FIG. 1 shows an exhaust gas heat exchanger 100 (hereinafter, referred to as an EGR gas heat exchanger) that relates to the first embodiment and a second embodiment described later.

The EGR system includes an exhaust gas recirculation pipe 210 through which a part of the exhaust gas discharged from the engine 200 returns to an intake side of the engine 200. An EGR valve 220 for adjusting the amount of exhaust gas recirculation in accordance with an operational state of the engine 200 is disposed in the exhaust gas recirculation pipe 210. The EGR gas heat exchanger (EGR cooler) 100 is disposed between an exhaust gas side of the engine 200 and the EGR valve 220 so that heat exchange is performed between the exhaust gas discharged from the engine 200 and cooling water (i.e., engine-cooling water).

Next, a structure of the EGR gas heat exchanger 100 will be described with reference to FIGS. 5A and 5B.

EGR gas heat exchanger 100 comprises plural, in this case, four exhaust gas tubes 101 each of which has a flat rectangular cross section, and each of which is formed by joining two plates (not shown) facing each other. As shown in FIG. 7, an inner fin 101b, which is for partitioning the space formed in each exhaust gas tube 101 to form plural fine passages by being folded many times, is disposed in each exhaust gas tube 101. A tank 102 has a tubular shape and a flat rectangular cross section. This tank and the exhaust gas tubes 101 form a heat exchanging core. The exhaust gas tubes 101 are laminated in the tank 102 so as to be disposed in substantially parallel with each other. Moreover, a longitudinal direction of the exhaust gas tubes 101 and a longitudinal direction of the tank 102 match with each other in the tank 102.

The tank 102 is closed at both of its side ends by core plates 103 so that respective side ends of each exhaust gas tube 101 in the tank 102 penetrate the respective core plates 103 and are supported by the respective core plates 103.

A cooling water inlet pipe 104 is connected to the tank 102 at the vicinity of root portions 101a at upstream side portions of the exhaust gas tubes 101. Moreover, the cooling water inlet pipe 104 is connected to the tank so as to be disposed substantially perpendicular to a laminated direction of the exhaust gas tubes 101 so that the cooling water can easily enter each gap formed between each adjacent laminated exhaust gas tubes 101 when the cooling water flows into the tank 102 through the cooling water inlet pipe 104. A cooling water outlet pipe 105 is connected to the tank 102 at the vicinity of downstream side portions of the exhaust gas tubes 101 so that the tank 102 serves as a passage for the cooling water. The main stream of the cooling water substantially follows the stream of the exhaust gas passing through the exhaust gas tubes 101 in the tank 102.

Bonnets 106, 107 are connected to the both side ends of the tank 102 so that edges of both core plates 103 are folded in opposite directions with regard to the bonnets 106, 107 as shown the figures, and are overlapped by end portions of the bonnets 106, 107. An exhaust gas inlet 106a is formed in the bonnet 106 disposed at a cooling water inlet pipe side that is for introducing the exhaust gas to the bonnet 106. An exhaust gas outlet 107a is formed in the bonnet 107 disposed at a cooling water outlet pipe side that is for exhausting the exhaust gas from the bonnet 106 to the outside. Both of the bonnets 106, 107 have a quadrangular pyramid-like shape so that the duct cross sectional area increases toward the heat exchanging core.

Hereinafter, main portion of the present invention will be described. A pair of ribs 108a, 108b are formed as guides on both main surfaces of each exhaust gas pipe 101 at portions of both main surfaces close to the exhaust gas inlet 106a by an embossing process. As shown in FIG. 5A, the ribs 108a, 108b have an elliptic shape so that an ellipse extends from an end portion of the exhaust gas tube 101 in the width direction (longitudinal direction of the cross section) to the vicinity of a central portion of the passage for the cooling water in the width direction so as to be disposed in a cross direction with respect to the longitudinal direction of the exhaust gas tubes 101 and the longitudinal direction of the tank 102 that matches a direction of the main stream of the cooling water. A small passage through which the cooling water can pass is formed between the pair of ribs 108a, 108b. Both ribs 108a, 108b formed on the exhaust gas tube 101 contact to the other ribs 108a, 108b formed on adjoining one of the exhaust gas tubes 101. The respective pairs of ribs 108a, 108b formed on the respective outer main surfaces of the respective outermost exhaust gas tubes 101om contact to a respective protrusion 109 formed on the inner wall of the tank in the laminated direction of the exhaust gas tubes 101. The protrusions 109 have a shape similar to that of the pair of ribs 108a, 108b.

In this EGR gas heat exchanger 100 described above, the exhaust gas introduced from the exhaust gas inlet 106a passes through the bonnet 106 and each of the exhaust gas tubes 101. Then, the exhaust gas cooled down by the cooling water flowing around each of the exhaust gas tubes 101 is exhausted from the exhaust gas outlet 107a through the bonnet 107.

The cooling water flows into the tank 102 through the cooling water inlet pipe 104 and passes through gaps formed between each adjacent exhaust gas tubes 101 and gaps formed between the inner wall of the tank 102 and each of the outermost exhaust gas tubes 101om. At the time when the cooling water flows into the tank 102 through the cooling water inlet pipe 104, the cooling water coming into the tank 102 along a direction substantially perpendicular to the longitudinal direction of the tank 102. Therefore, the cooling water after coming into the tank 102 through the cooling water inlet pipe 104 collides with an inner wall 102a of the tank 102 that is opposite to the cooling water inlet pipe 104. Then, the cooling water flows so as to be divided toward the respective outermost exhaust gas tubes 101om in the laminated direction of the exhaust gas tubes 101 (up-down direction in FIG. 5B). The divided streams of the cooling water go to, for example, the gaps formed between the inner wall of the tank 102 and each of the outermost exhaust gas tubes 101om, and pass the gaps along the respective ribs 108b formed on the respective outermost exhaust gas tubes 101om to forcibly go to the vicinity of the respective root portions 101a (end portions of upstream side) of the respective outermost exhaust gas tubes 101om as shown by arrow C in FIG. 5A.

The stream C of the cooling water along the rib 108b is merged with the stream A of the cooling water coming into the tank from the cooling water inlet pipe 104 between the ribs 108a and 108b, and then, goes toward the cooling water outlet pipe 105.

According to the first embodiment, the stream C can flow along the rib 108b so as to pass the upstream side of the outermost exhaust gas tubes 101om. Therefore, the cooling water is prevented from being stuck at the upstream side of the exhaust gas, thereby preventing the cooling water from being boiled partially.

In this embodiment, the ribs 108b are formed on each exhaust gas tube 101. Therefore, the stream C flowing along the rib 108b can occur at any gap formed between adjacent exhaust gas tubes 101 as well as the gaps formed between the inner wall of the tank 102 and the outermost exhaust gas tubes 101om.

In this embodiment, the respective ribs 108a, 108b contact to the other respective ribs 108a, 108b formed on adjacent exhaust gas tube 101. Also, the respective pairs of ribs 108a, 108b formed on the respective outer main surfaces of the respective outermost exhaust gas tubes 101om contact to the respective protrusions 109 formed on the inner wall of the tank 102. Therefore, the ribs 108a, 108b and the protrusions 109 serve as reinforcement parts for reinforcing the exhaust gas tubes 101 as well as the tank and the passage for the cooling water.

In the producing process of the EGR gas heat exchanger 100, when the exhaust gas tubes 101 are connected with each other and soldered with each other using solder, the proper load can be supplied to the exhaust gas tubes 101 and the inner fin 101b in each exhaust gas tube 101 due to the existence of the ribs 108a, 108b, whereby failure of soldering can be prevented. Also, the ribs 108a, 108b keep intervals constant between every two of the exhaust gas tubes 101 and formed between the inner wall of the tank 102 and the outermost exhaust gas tubes 101om.

Although the ribs 108a, 108b in this embodiment are formed using an embossing process, they can be formed using the other ways. For example, the ribs 108a, 108b can be formed discretely from the exhaust gas tubes 101. Also, the shape of the ribs 108a, 108b is not limited to the elliptic shape. The shape of the rib may be varied as long as it flows the cooling water after colliding the inner wall of the tank toward the upstream side of the exhaust gas tubes 101 so as to regulate the stream of the cooling water as shown in the FIG. 5A. Moreover, the ribs can be formed only on the outermost exhaust gas tubes 101om since the cooling water after colliding the inner wall 102a of the tank 102 especially easily flows toward the gaps formed between the inner wall of the tank 102 and the outermost exhaust gas tubes 101om. Also, the number of the exhaust gas tubes 101 in the tank 102 is not limited to four.

Second Embodiment

In the above embodiment, the ribs are used for leading the cooling water after colliding with the inner wall 102a of the tank 102 toward the upstream side of the exhaust gas tubes 101.

In this embodiment, instead of the ribs, partition walls (anti-reflection boards) are used to prevent the cooling water from flowing into the gaps formed between the inner wall of the tank 102 and the outermost exhaust gas tubes 101om.

As shown in FIGS. 6A, 6B, and 7, the exhaust gas tubes 101 are laminated in 4 layers as shown in the first embodiment. Moreover, they are divided into two parts in each layer thereof. Inner fins 101b and louvers 101c are formed in each exhaust gas tube 101. The louvers 101c fixed to the inner fines 101b are for causing vortex flow in the fine passages.

The partition walls 110 (110a) are formed between the inner wall 102a of the tank 102 and the exhaust gas tubes 101. The partition walls 110a are formed by folding a plate to form the partition. That plate is disposed between the gap formed between the inner wall 102a of the tank 102 and the exhaust gas tubes 101 so that folded portions of the plate contact to the inner wall 102a of the tank and the exhaust gas tubes 101. As shown in FIG. 7, the respective water passages 111 for the cooling water, which are formed between adjacent exhaust gas tubes 101, are partitioned from the respective water passages 112 for the cooling water, which are formed between the inner wall of the tank 102 and the outermost exhaust gas tubes 101om, by the partition walls 110a.

The cooling water flowing into the tank 102 through the cooling water inlet pipe 104 flows into each water passage 111, 112 as shown by arrows E in FIGS. 6A and 7. The cooling water flowing into the water passages 111 is prevented from flowing into the water passages 112, and flows toward the cooling water outlet pipe 105. Similar to the first embodiment, the occurrence of the stuck water at the upstream side of the exhaust gas tubes 101, which may be caused by the interfering of the cooling water after colliding with the inner wall 102a against the cooling water just flowing into the tank 102 through the cooling water inlet tube 104, is prevented. Therefore, the cooling water can be prevented from being boiled partially.

Although the partition walls are formed as the anti-reflection plate by folding the plate in this embodiment, they can be formed by the other ways. Also, the shape or size of the walls is not limited to that of this embodiment. Moreover, the partition walls may be used for substantially preventing the cooling water in the water passages 111 after impacting the inner wall 102a of the tank 102 from flowing into the water passages 112. Therefore, a small gap can be allowed between the partition walls and the exhaust gas tubes 101 or between the partition walls and the inner wall 102a of the tank 102 as long as the cooling water is substantially prevented from flowing into the water passages 112 even if the small gap exists.

In the above embodiments, the size, shape, a portion to be formed, or the number of ribs or partition walls may be varied to effect the regulation of the stream of the cooling water.

Third Embodiment

In the above-described embodiments, the flow regulation of the cooling water has been discussed. In embodiments described later, the flow rate of fluid for cooling the exhaust gas flowing through the exhaust gas tubes, i.e., in this embodiment, the flow rate of cooling water will be discussed to prevent the cooling water from boiling locally.

Figure 8:
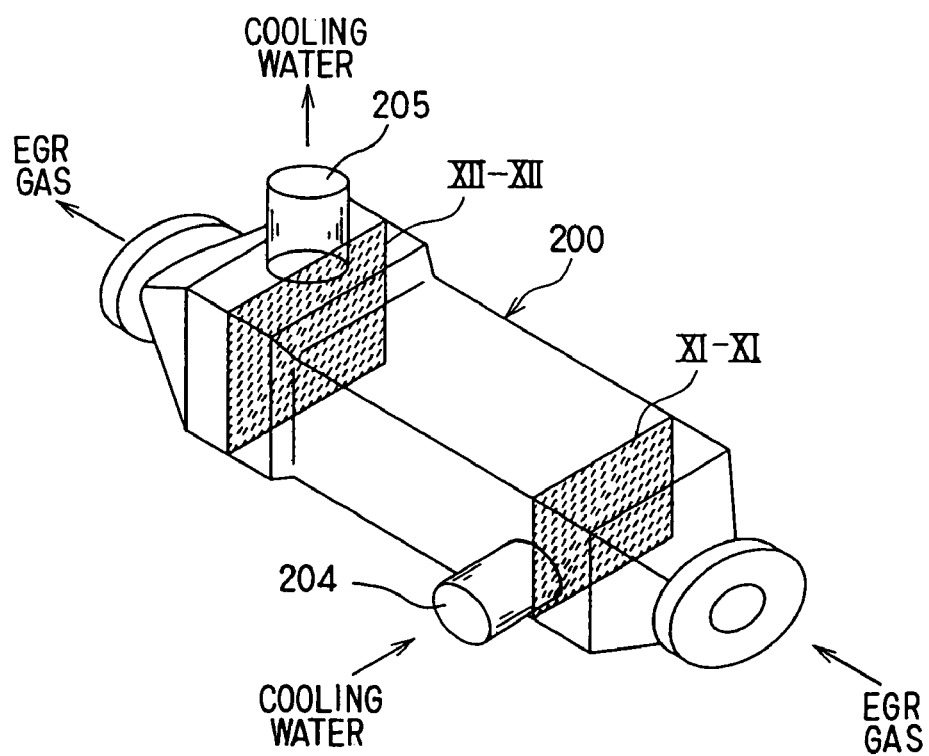
FIG. 8 is a perspective view of the EGR cooler in third and fourth embodiments of the present invention.

An EGR cooler (i.e., an EGR gas heat exchanger) is perspectively shown in FIG. 8. EGR gas, i.e., exhaust gas from the engine 200 as shown in FIG. 4 flows into the EGR cooler at a right side in the figure, flows through the EGR cooler, and then, flows out from the EGR cooler at a left side in the figure. Cooling water flows into the EGR cooler through a cooling water inlet pipe (a fluid inlet) 204 to exchange heat with the exhaust gas flowing through the EGR cooler. The cooling water flows out from the EGR cooler through a cooling water outlet pipe 205 (a fluid outlet).

Figure 11:
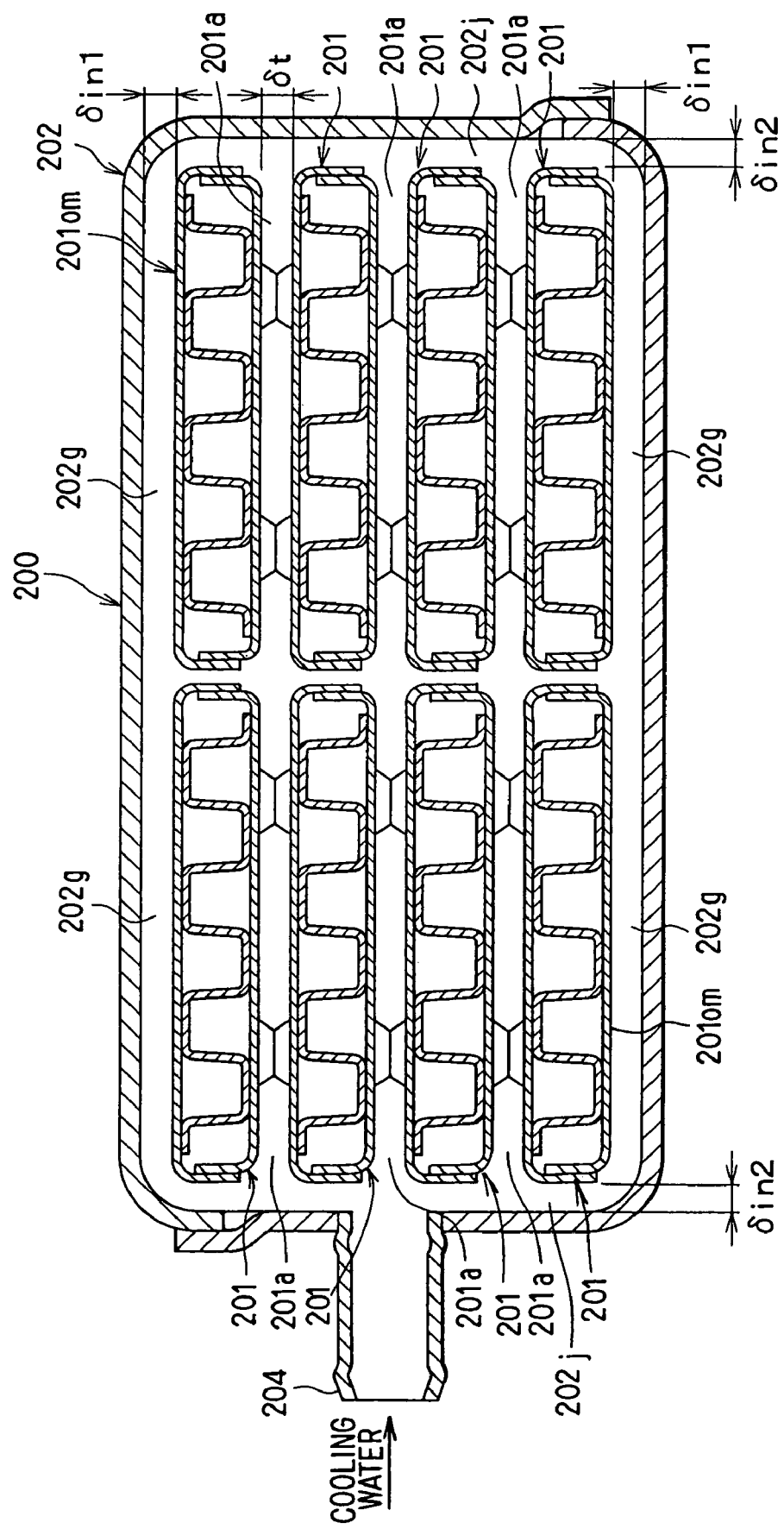
FIG. 11 is a cross sectional view of the EGR cooler in the third embodiment of the present invention taken along line XI-XI in FIG. 9B.
Figure 12:
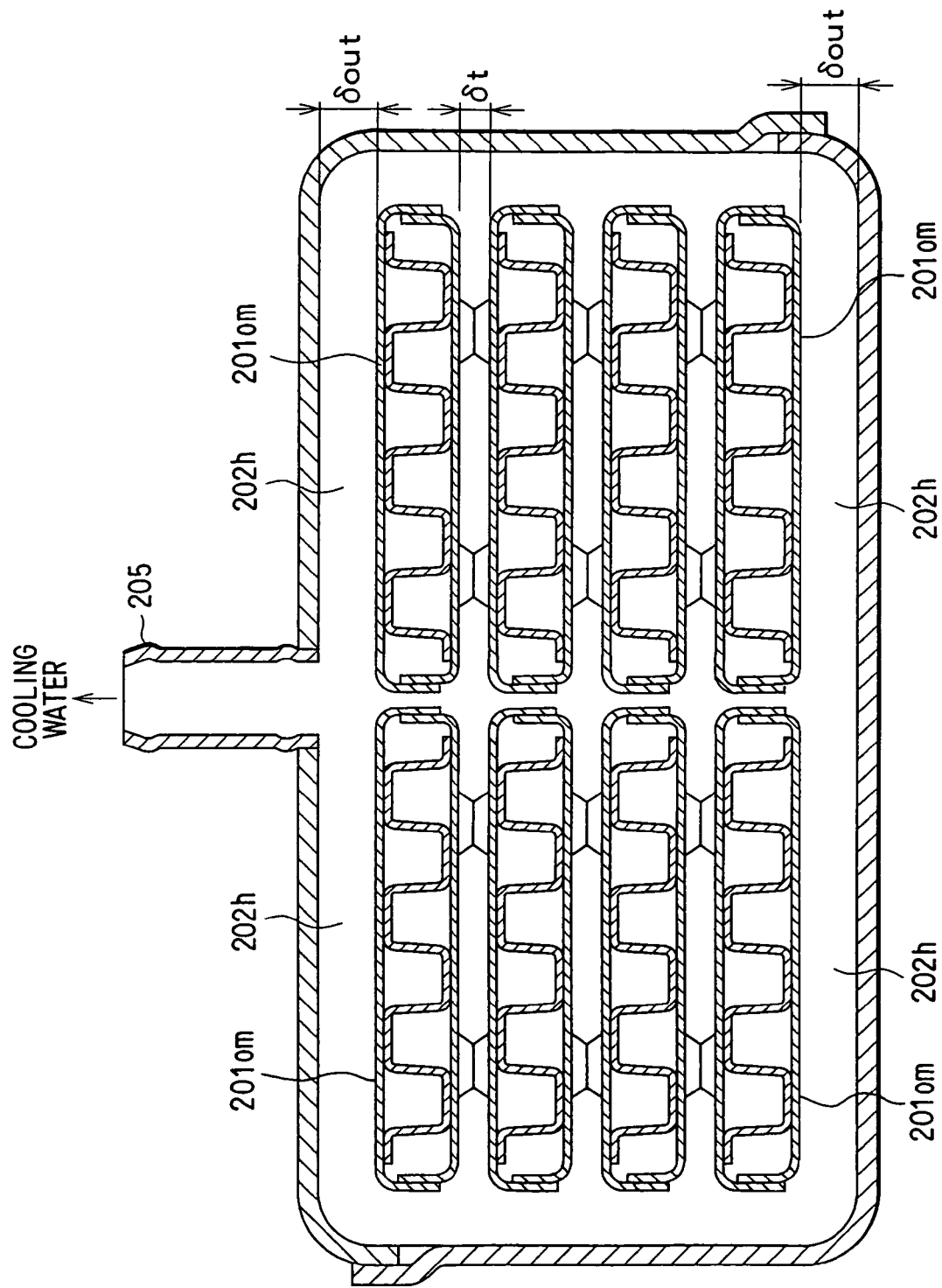
FIG. 12 is a cross sectional view of the EGR cooler in the third embodiment of the present invention taken along line XII-XII in FIG. 9B.

In FIG. 8, XI-XI and XII-XII mean cross sectional view points that are shown in FIGS. 11 and 12, respectively.

Figure 5A:
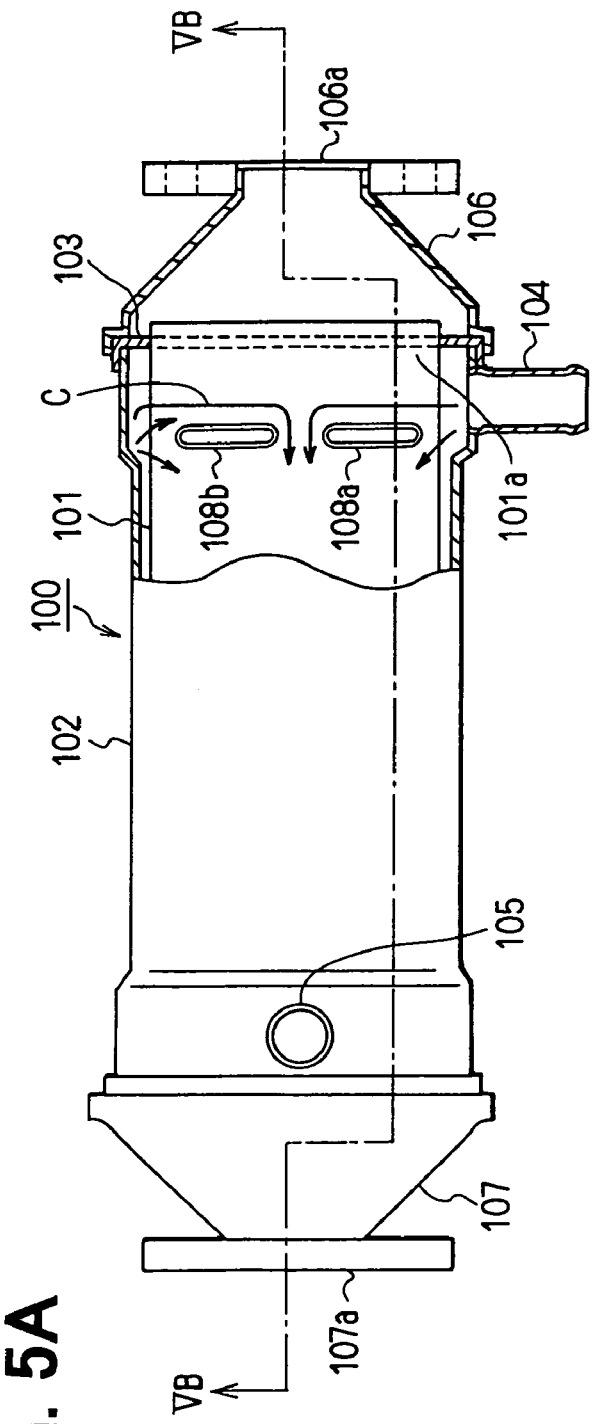
FIG. 5A is a partial cross sectional view of an EGR gas heat exchanger in a first embodiment of the present invention.
Figure 5B:
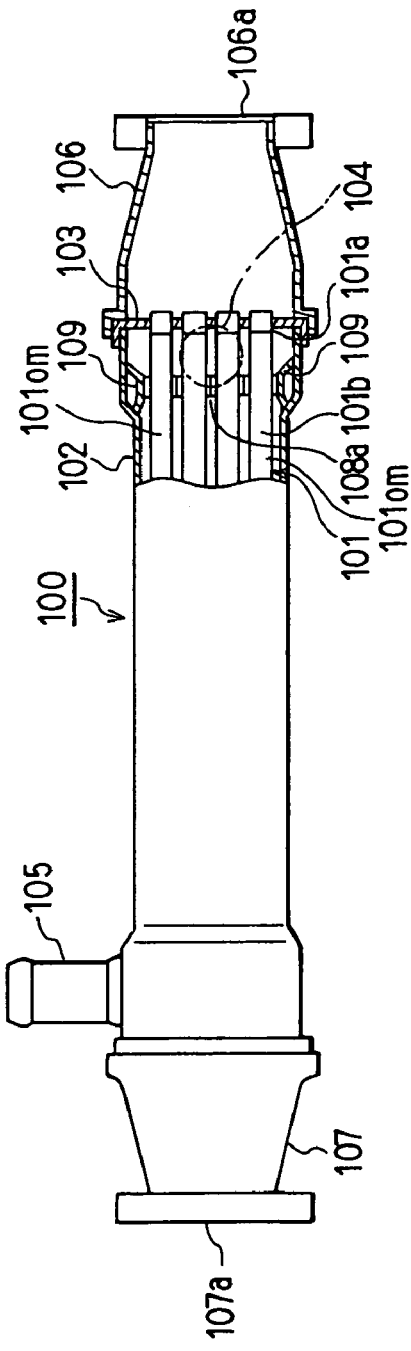
FIG. 5B is a partial cross sectional view of the EGR gas heat exchanger in the first embodiment of the present invention taken along line VB-VB in FIG. 5A.

FIGS. 9A and 9B and numerals thereon are figures and numerals similar to FIGS. 5A and 5B, and therefore, the explanation thereof will be omitted.

In FIGS. 9A and 9B, a distribution joint 206 is for distributing the exhaust gas to the exhaust gas tubes 201. A gathering joint 207 is for gathering the exhaust gas passing through the exhaust gas tubes 201. Joint portions 206a and 207a of the joints 206 and 207 are connected to exhaust gas recirculation pipe 210 shown in FIG. 4.

Figure 10:
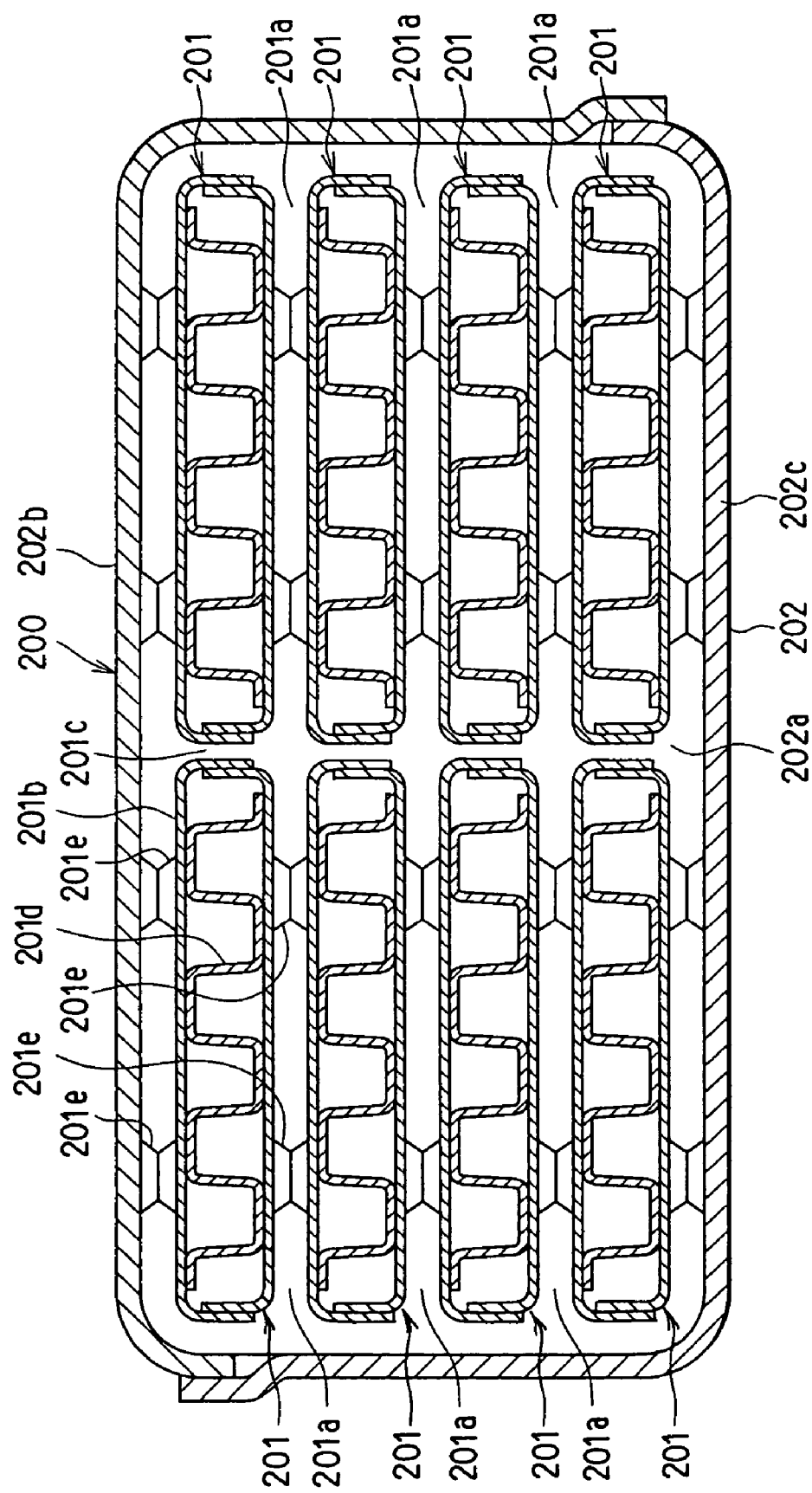
FIG. 10 is a cross sectional view of the EGR cooler in the third embodiment of the present invention taken along line X-X in FIG. 9B.

As shown in FIG. 10, each exhaust gas tube 201 has a flat sectional shape through which the exhaust gas flows. The plural exhaust gas tubes are laminated in a shortest length direction, i.e., a thickness direction of the exhaust gas tube 201 (an up-and-down direction in FIG. 10), with a space 201a interposed between adjacent exhaust gas tubes 201. The exhaust gas tubes 201 are arranged in two rows in a width direction of the exhaust gas tube 201 (a lateral direction in FIG. 10). In each row, four exhaust gas tubes 201 are laminated. Each exhaust gas tube has two plates 201b, 201c that are pressed into "C" character-like sectional shape and soldered using copper solder or the like with each other to form the shape thereof, and has a folded fin 201c to improve the heat exchange efficiency between the exhaust gas and cooling water by increasing contacting area (heat conducting area) between the exhaust gas and the fin 201c. The folded fin is connected to the plates 201b and 201c by solder using copper solder or the like.

The space 201a is kept by contacting tops of protrusions 201e that are protruded from the plates 201b and 201c by a press process or the like. The protrusions 201e are discretely formed on the exhaust gas tubes 201 so as not to be formed on portions in the vicinity of the cooling water inlet pipe 204 and cooling water outlet pipe 205.

For example, the exhaust gas tubes 201 and folded fins 201d are made from stainless steal that is excellent in corrosion resistance and heat resistance.

The casing 202 is a rectangular pipe in which the exhaust gas tubes 201 is arranged and through which the cooling water flows around the exhaust gas tubes 201. The casing 202 also is made of metal that is excellent in corrosion resistance and heat resistance, for example, stainless steal plates 202b and 202c fixed with each other by soldering using copper solder or the like.

The cooling water inlet pipe 204 is provided on the casing 202 so that the cooling water flows into the casing 202 in a direction substantially perpendicular to a longitudinal direction of the exhaust gas tubes 201 and substantially parallel with flat main surfaces of the exhaust gas tubes 201. On the other hand, the cooling water outlet pipe 205 is provided on the casing 202 so that the cooling water flows out from the casing 202 in a direction substantially perpendicular to the longitudinal direction of the exhaust gas tubes 201 and substantially perpendicular to the flat main surfaces of the exhaust gas tubes 201.

The cooling water inlet pipe 204 and cooling water outlet pipe 205 are for being connected to external cooling water pipes.

As shown in FIG. 11, spaces 202g extend between an inner wall of the casing 202 and outermost exhaust gas tubes 201om in a direction generally parallel with the inflow direction of the cooling water flowing into the casing through the cooling water inlet pipe 204. The width of the space 202g in a laminated direction of the exhaust gas tubes 201, i.e., in a direction generally perpendicular to the inflow direction of the cooling water and perpendicular to a longitudinal direction of the exhaust gas tubes 201 (perpendicular to a sheet of the figure), is δ in1, as shown in FIG. 11. The width δ in1 of the spaces 202g is almost equal to the width δ t of the space 201a between adjacent exhaust gas tubes 201.

Meanwhile, as shown in FIG. 12, spaces 202h extend between the inner wall of the casing 202 and the outermost exhaust gas tubes 201om in the vicinity of the cooling water outlet pipe 205 in a direction generally perpendicular to an outflow direction of the cooling water flowing out from the casing 202 through the cooling water outlet pipe 205. The width of the spaces 202h in the laminated direction of the exhaust gas tubes 201, i.e., in a direction generally parallel with the outflow direction of the cooling water and perpendicular to the longitudinal direction of the exhaust gas tubes 201 (perpendicular to a sheet of the figure), is δ out, as shown in FIG. 12 (as understood from FIGS. 8, 9A and 9B). The width δ out of the spaces 202h is greater than that of the space 201a between adjacent exhaust gas tubes 201.

Specifically, the width δ in1 is equal to 1 mm or more but equal to 5 mm or less (2 mm in this embodiment). The width δ out is equal to 5 mm or more (5 mm in this embodiment).

The lower limit of the width δin1 is defiled in such a degree that the spaces 202g that serve as cooling water passages are prevented from being clogged with extraneous substance in the cooling water. Meanwhile, the upper limit of the width δ in1 is defiled in such a degree that the flow rate of the cooling water flowing through the spaces 202g is not lowered lower than a predetermined rate.

Most of the cooling water flowing into the casing 202 through the cooling water inlet pipe 204 flows through the spaces 201a between spaces 201a facing the cooling water inlet pipe 204, i.e., spaces 201a formed between two exhaust gas tubes 201 in the second and third layers. Then, most of the cooling water collides with the inner wall of the casing 200 that is opposite to the cooling water inlet pipe 204 (a right side wall in FIG. 11).

Therefore, the mass flow of the cooling water is smaller in the spaces 202g than in the spaces 202a because the spaces 202g are farther away from the space 201a between the exhaust gas tubes 201 in the second and third layers in the direction perpendicular to the inflow direction of the cooling water and perpendicular to the longitudinal direction of the exhaust gas tubes 201 (perpendicular to a sheet of the figure). Accordingly, the flow rate in the spaces 202g become small. As a result, the cooling water might be likely boiled at the spaces 202g.

In this embodiment, the spaces 202g are regulated in width of δ in1 similar to that of δ in1 of the spaces 201a to prevent the flow rate therein from being lowered lower than the predetermined rate. Therefore, the local boiling of the cooling water is prevented at the spaces 202g.

Similar to the spaces 202g, the width δ t of the spaces 201a is selected between the width with which the spaces 201a are prevented from being clogged with extraneous substance in the cooling water and the width with which the flow rate of the cooling water flowing through the spaces 201a is not lowered lower than the predetermined rate.

To the contrary, the cooling water is collected in the vicinity of the cooling water outlet pipe 205 after flowing through the casing 202. Therefore, if the width δ out of the spaces 202h was small, the pressure loss might be increased at the spaces 202h that might reduce the amount of the cooling water flowing into the EGR cooler 200. In this situation, the local boiling might be caused.

In this embodiment, the width δ out of the spaces 202h in the vicinity of the cooling water outlet pipe 205 is greater than the width δ t of the spaces 201a between adjoining exhaust gas tubes 201 to prevent the pressure loss from being increased. Therefore, the cooling water flowing into the casing 202 is prevented from decreasing, thereby preventing the local boiling of the cooling water from occurring and preventing cooling efficiency of the exhaust gas from being lowered.

Moreover, as shown in FIG. 11, spaces 202j are formed between inner walls of the casing 202 that are disposed generally perpendicular to the inflow direction of the cooling water and sides of the exhaust gas tubes 201. The width of the spaces 202j in a direction generally parallel with the inflow direction of the cooling water, i.e., in a parallel direction of the figure, is δ in2. The width δ in2 is substantially equal to the width δ t of the spaces 201a between adjoining exhaust gas tubes 201 for the same reason described above.

Fourth Embodiment

In this embodiment, differences between the third embodiment and this embodiment will be mainly described.

Figure 13:
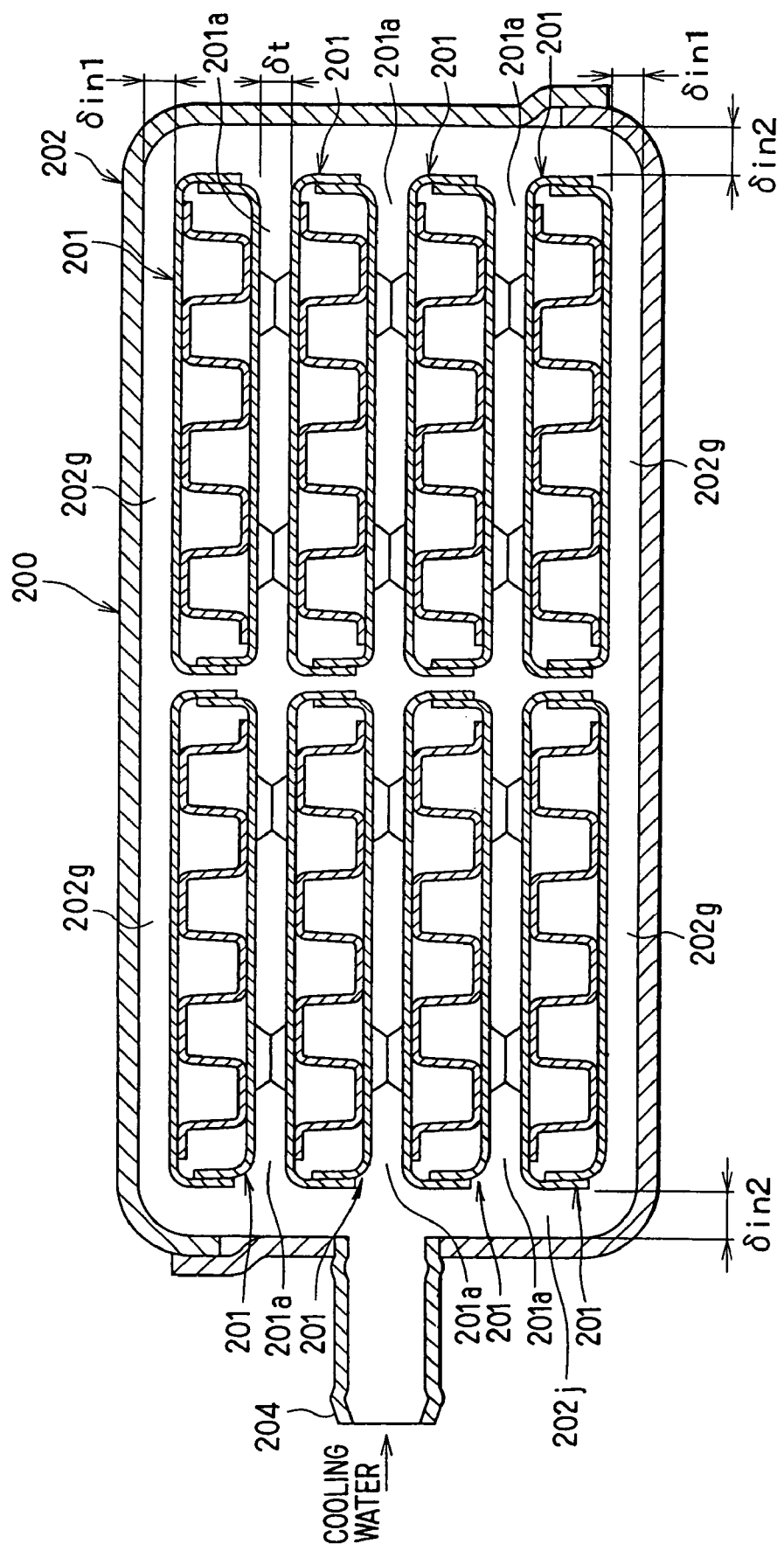
FIG. 13 is a cross sectional view of the EGR cooler in the fourth embodiment of the present invention similar to FIG. 11.

As shown in FIG. 13, the width δ in2 of the spaces 202j is greater than the width δ t of the spaces 201a. Specifically, the width δ in2 of the spaces 202j is equal to 5 mm or more (5 mm in this embodiment), the width δ in1 of the spaces 202g is equal to 1 mm or more but equal to 5 mm or less (2 mm in this embodiment), and the width δ out of the spaces 202h is equal to 5 mm or more (5 mm in this embodiment).

With this feature, the distribution efficiency of the cooling water to each space 201a between each adjacent exhaust gas tube 201 in the laminated direction can be improved. Moreover, the pressure loss in the vicinity of the cooling water outlet pipe 205 can be reduced.

Although the spaces 202h are greater in width than the spaces 202g in the above-described embodiments, it is not necessarily to form the wider spaces 202h. Instead of changing the shape of the casing 202, the size or the location of the exhaust gas tubes 201 can be varied to match the size dimension of the width of spaces 202g with that of the spaces 201a.

Figure 14:
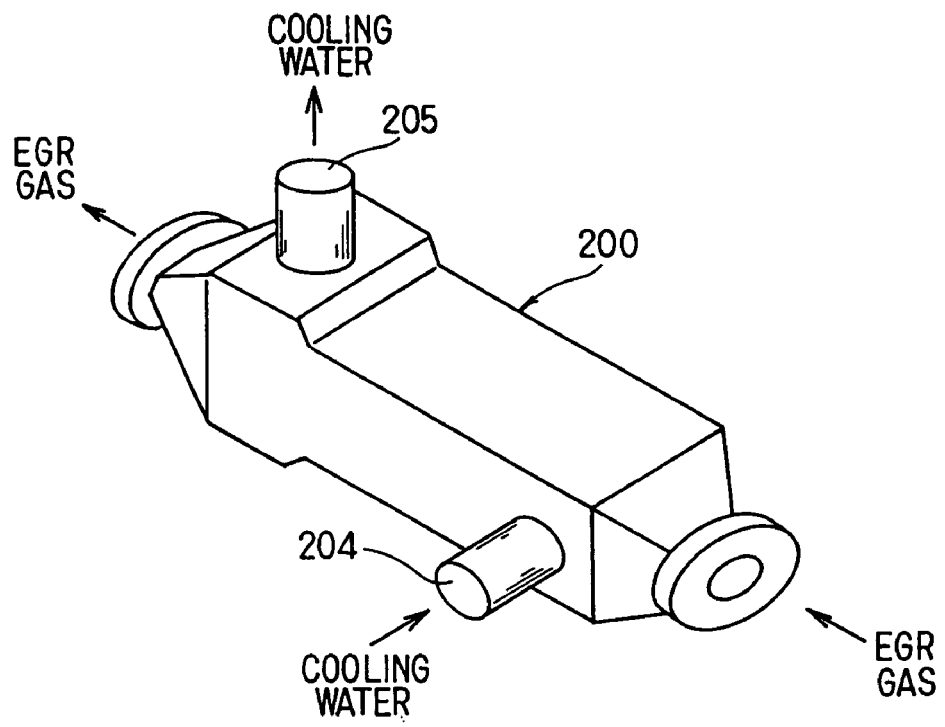
FIG. 14 is a perspective view of the EGR cooler in the other embodiment of the present invention.
Figure 15:
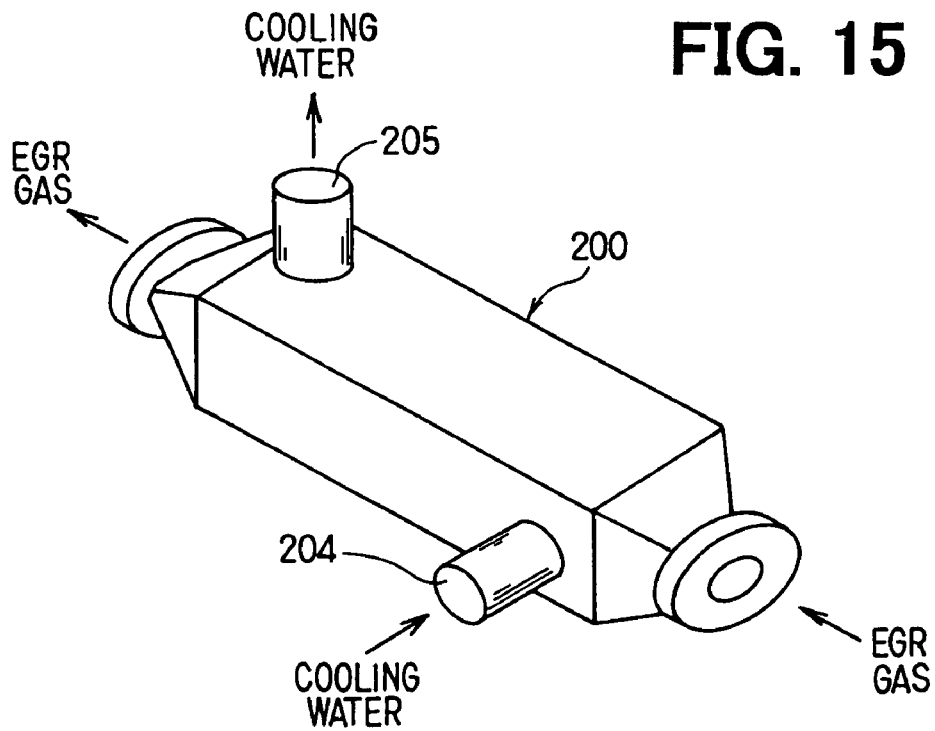
FIG. 15 is a perspective view of the EGR cooler in the other embodiment of the present invention.

The space between the exhaust gas tubes 201 and the inner wall of the casing 202 is formed wider in the vicinity of the cooling water outlet pipe 205 at entirely circumference as shown in FIG. 8. However, as shown in FIG. 14, the wider portion of the casing 202 may be limited to a portion where the spaces 202h are located between the inner wall of the casing 202 and the outermost exhaust gas tubes 201om in the vicinity of the cooling water outlet pipe 205 in the laminated direction of the exhaust gas tubes 201 and a portion close to the outlet side with respect to the inlet side of the casing where the spaces 202h are located between the inner wall of the casing 202 and the outermost exhaust gas tubes 201om at an opposite side of the portion where the cooling water outlet pipe 205 is located in the laminated direction.

Moreover, the spaces 202h in the outlet side of the casing 202 may be formed so that the width thereof is identical to that of the spaces 201a between adjacent exhaust gas tubes 201 similar to the spaces 202g in the inlet side of the casing 202.

Figure 16:
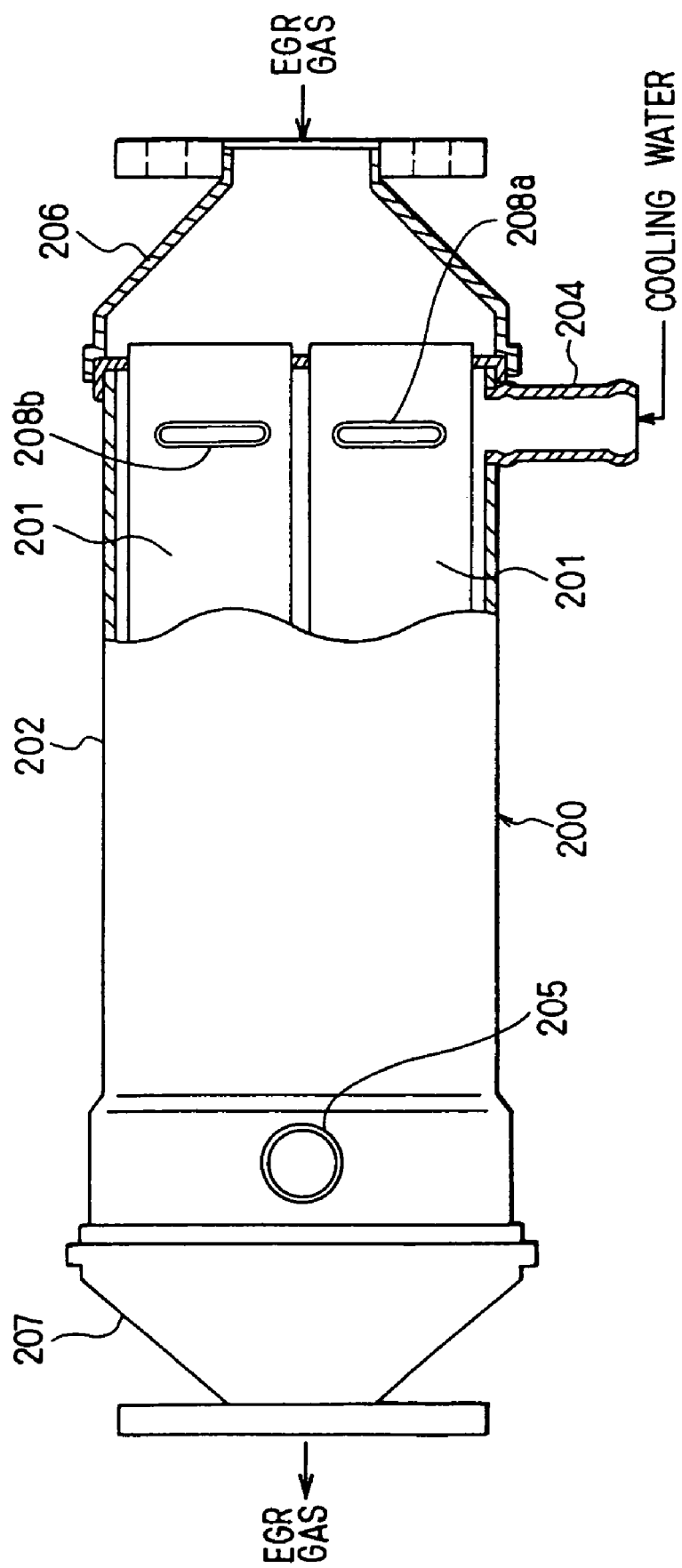
FIG. 16 is a partial cross sectional view of an EGR cooler in the other embodiment of the present invention.

Moreover, as shown in FIG. 16, ribs 208a or ribs 208b also can be formed on each exhaust gas tube 201 that are shown FIGS. 5A and 5B so as to regulate the flow of the cooling water in addition to keeping the flow rate of the cooling water in the casing 202 by adjusting the size of the spaces.

While the present invention has been shown and described with reference to the foregoing preferred embodiment, it will be apparent to those skilled in the art that changes in form and detail may be therein without departing from the scope of the invention as defined in the appended claims.

What is claimed is:

1. An exhaust gas heat exchanger comprising:
   a plurality of exhaust gas tubes through which exhaust gas generated by combustion flows;
   a casing in which the plurality of exhaust gas tubes are arranged, defining a fluid passage therein through which fluid flows around the plurality of exhaust gas tubes to exchange heat with the exhaust gas;
   a fluid inlet disposed on the casing at an inlet side of the plurality of exhaust gas tubes through which the fluid flows into the casing along a direction substantially perpendicular to a longitudinal direction of the plurality of exhaust gas tubes;
   an outer space defined at a longitudinal position of the casing aligned with the fluid inlet between an inner wall of the casing and an outermost exhaust gas tube of the plurality of exhaust gas tubes, and extending longitudinally in a direction substantially parallel with an inflow direction of the fluid flowing into the casing through the fluid inlet; and
   a fluid flow regulating means provided in the fluid passage close to an upstream side of the plurality of exhaust gas tubes for regulating a stream of the fluid at a vicinity of the upstream side of the plurality of exhaust gas tubes so that the fluid after colliding with a side inner wall of the casing is led toward an upstream side of the plurality of exhaust gas tubes, the fluid flow regulating means extending in a direction crossing the longitudinal direction of the exhaust gas tubes; wherein
   a width of the outer space, in a direction substantially perpendicular to the inflow direction of the fluid and substantially perpendicular to the longitudinal direction of the plurality of exhaust gas tubes, is substantially equal to that of an inner space defined between adjacent exhaust gas tubes at the longitudinal position of the casing aligned with the fluid inlet;
   each of the plurality of exhaust gas tubes is a flat tube having a major dimension and a smaller minor dimension in a cross section; and
   the fluid flow regulating means extends longitudinally only in a direction of the major dimension in the cross-section of the flat tube.

2. An exhaust gas heat exchanger according to claim 1, wherein each exhaust gas tube has a flat sectional shape, and the plurality of exhaust gas tubes are laminated in a thickness direction thereof with the inner space defined between adjacent exhaust gas tubes, and wherein the inflow direction of the fluid is substantially perpendicular to a laminated direction of the plurality of exhaust gas tubes.

3. An exhaust gas heat exchanger according to claim 1, further comprising:
   a fluid outlet disposed on the casing through which the fluid flows out from the casing in a direction substantially perpendicular to the longitudinal direction of the plurality of exhaust gas tubes; and an outlet side outer space defined between the inner wall of the casing and the outermost exhaust gas tube at the vicinity of the fluid outlet, extending longitudinally in a direction substantially perpendicular to an outflow direction of the fluid flowing out from the casing, wherein:

a width of the outlet side outer space, in a direction substantially parallel with the outflow direction of the fluid, is greater than that of the inner space defined between adjacent exhaust gas tubes.

4. An exhaust gas heat exchanger according to claim 1, further comprising:

a fluid outlet disposed on the casing, through which the fluid flows out from the casing in a direction substantially perpendicular to the longitudinal direction of the plurality of exhaust gas tubes; and an outlet side outer space defined between the inner wall of the casing and the outermost exhaust gas tube at the vicinity of the fluid outlet, extending longitudinally in a direction substantially perpendicular to an outflow direction of the fluid flowing out from the casing through the fluid outlet, wherein:

a width of the outlet side outer space, in a direction substantially parallel with the outflow direction of the fluid, is equal to or greater than 5 mm.

5. An exhaust gas heat exchanger according to claim 1, further comprising:

a side space defined between a side inner wall of the casing and the plurality of exhaust gas tubes, extending longitudinally in a direction substantially perpendicular to the inflow direction of the fluid, wherein a width of the side space, in a direction substantially parallel with the inflow direction of the fluid, is equal to or greater than that of the inner space defined between adjacent exhaust gas tubes.

6. An exhaust gas heat exchanger according to claim 1, further comprising:

a side space defined between a side inner wall of the casing and the plurality of exhaust gas tubes, extending longitudinally in a direction substantially perpendicular to the inflow direction of the fluid, wherein a width of the side space, in a direction substantially parallel with the inflow direction of the fluid, is equal to or greater than 1 mm.

7. An exhaust gas heat exchanger according to claim 1, wherein the flow regulating means extends in a direction approximately perpendicular to the longitudinal direction of the plurality of exhaust gas tubes.

8. The exhaust gas heat exchanger according to claim 1, wherein the fluid flow regulating means extend inward from the casing.

9. An exhaust gas heat exchanger comprising:

a plurality of exhaust gas tubes through which exhaust gas generated by combustion flows;

a casing in which the plurality of exhaust gas tubes are arranged, defining a fluid passage therein through which fluid flows around the plurality of exhaust gas tubes to exchange heat with the exhaust gas;

a fluid inlet disposed on the casing at an inlet side of the plurality of exhaust gas tubes, through which the fluid flows into the casing along a direction substantially perpendicular to a longitudinal direction of the plurality of exhaust gas tubes;

a first outer space defined at a longitudinal position of the casing aligned with the fluid inlet between an inner wall of the casing and an outermost exhaust gas tube of the plurality of exhaust gas tubes, and extending longitudinally in a direction substantially parallel with an inflow direction of the fluid flowing into the casing through the fluid inlet; and a fluid outlet disposed on the casing through which the fluid flows out of the casing in the direction substantially perpendicular to the longitudinal direction of the plurality of exhaust gas tubes; and a second outer space defined at a longitudinal position of the casing aligned with the fluid outlet between the inner wall of the casing and the outermost gas tube of the plurality of exhaust gas tube and extending longitudinally in a direction substantially parallel with an outflow direction of the fluid flowing from the casing through the fluid outlet;

the casing is enlarged in a part of the casing adjacent the fluid outlet to increase a passage area of the fluid passage;

the exhaust gas tubes are arranged in the casing to have a width of the first outer space approximately equal to a clearance defined between adjacent tubes and a width of the second outer space being larger than the width of the first outer space.

10. An exhaust gas heat exchanger according to claim 9, wherein each exhaust gas tube has a flat sectional shape, and the plurality of exhaust gas tubes are laminated in a thickness direction thereof with an inner space defined between adjacent exhaust gas tubes, and wherein the inflow direction of the fluid is substantially perpendicular to a laminated direction of the plurality of exhaust gas tubes.

11. An exhaust gas heat exchanger according to claim 9, further comprising:

an outlet side outer space defined between the inner wall of the casing and the outermost exhaust gas tube at the vicinity of the fluid outlet, extending longitudinally in a direction substantially perpendicular to an outflow direction of the fluid flowing out from the casing, wherein:

a width of the outlet side outer space, in a direction substantially parallel with the outflow direction of the fluid, is greater than that of the inner space defined between adjacent exhaust gas tubes.

12. An exhaust gas heat exchanger according to claim 9, further comprising:

an outlet side outer space defined between the inner wall of the casing and the outermost exhaust gas tube at the vicinity of the fluid outlet, extending longitudinally in a direction substantially perpendicular to an outflow direction of the fluid flowing out from the casing through the fluid outlet, wherein:

a width of the outlet side outer space, in a direction substantially parallel with the outflow direction of the fluid, is equal to or greater than 5 mm.

13. An exhaust gas heat exchanger according to claim 9, further comprising:

a side space defined between a side inner wall of the casing and the plurality of exhaust gas tubes, extending longitudinally in a direction substantially perpendicular to the inflow direction of the fluid, wherein a width of the side space, in a direction substantially parallel with the inflow direction of the fluid, is equal to or greater than that of the inner space defined between adjacent exhaust gas tubes.

14. An exhaust gas heat exchanger according to claim 9, further comprising:

a side space defined between a side inner wall of the casing and the plurality of exhaust gas tubes, extending longitudinally in a direction substantially perpendicular to the inflow direction of the fluid, wherein a width of the side space, in a direction substantially parallel with the inflow direction of the fluid, is equal to or greater than 1 mm.

15. An exhaust gas heat exchanger according to claim 9, further comprising:

a fluid flow regulating means provided in the fluid passage close to an upstream side of the plurality of exhaust gas tubes for regulating a stream of the fluid at a vicinity of the upstream side of the plurality of exhaust gas tubes so that the fluid after colliding with a side inner wall of the casing is led toward an upstream side of the plurality of exhaust gas tubes.

16. An exhaust gas heat exchanger according to claim 9, wherein the fluid inlet extends in a direction generally perpendicular to the fluid outlet.

17. An exhaust gas heat exchanger according to claim 9, wherein an outer space adjacent the fluid inlet defined between the inner wall of the casing and the plurality of exhaust gas tubes and extending longitudinally toward the enlarged part of the casing in a direction substantially perpendicular with the inflow direction of the fluid has a width in a direction substantially parallel to the inflow direction of the fluid and substantially perpendicular to the longitudinal direction of the gas tubes that is constant and substantially equal to that of the clearance defined between adjacent exhaust gas tubes.

18. The exhaust gas heat exchanger according to claim 9, wherein the area of the fluid passage at the first portion is adjacent and parallel to the inflow of fluid from the fluid inlet and the area of the fluid passage at the second portion is adjacent and parallel to the outflow of fluid from the fluid outlet.

19. The exhaust gas heat exchanger according to claim 9, wherein an annular rectangular space is defined between the inner wall of the casing and an outer surface of the plurality of exhaust gas tubes, the annular rectangular space defining four segments, each segment having a constant width along an entire length of the segment.

* * * * *